United States Patent [19]

Siadat et al.

[11] 4,379,869

[45] Apr. 12, 1983

[54] CATIONIC LATICES AND THEIR ELECTRODEPOSITION

[75] Inventors: Bahram Siadat; Joseph W. Raksis, both of Columbia, Md.

[73] Assignee: W. R. Grace & Co., New York, N.Y.

[21] Appl. No.: 225,337

[22] Filed: Jan. 15, 1981

[51] Int. Cl.[3] .................................................. C08K 9/00

[52] U.S. Cl. .................................... 523/206; 524/551; 524/552; 524/555; 524/815; 526/312

[58] Field of Search ................... 526/312; 260/29.6 R, 260/29.6 HN; 525/902, 293, 294, 259, 260; 524/551, 552; 523/206, 201

[56] References Cited

U.S. PATENT DOCUMENTS 3,329,638 7/1967 Blyth .................................. 525/293
3,734,873 5/1973 Anderson et al. .......... 260/29.6 HN
3,954,588 5/1976 Hazan et al. ............... 260/29.6 HN
4,056,501 11/1977 Gibbs et al. ......................... 523/206

FOREIGN PATENT DOCUMENTS 53-070136 10/1978 Japan .

*Primary Examiner*—Joseph L. Schofer
*Assistant Examiner*—N. Sarofim
*Attorney, Agent, or Firm*—Richard P. Plunkett; William W. McDowell, Jr.

[57] ABSTRACT

High molecular weight protonated latices stable typically up to pH of about 10 are cathodically electrodeposited onto electroconductive substrates, forming uniform, flexible coatings without the need of subsequent heat curing.

15 Claims, No Drawings

CATIONIC LATICES AND THEIR ELECTRODEPOSITION

This invention is directed to the use of specific types of latices in forming coatings by cathodic electro-deposition. The latices are characterized by the following key features:

1. High molecular weights typical of emulsion polymers; hence they do not require heat curing to achieve those properties typical of high polymers.

2. Emulsifier-free formulation; therefore the subsequent coatings are not contaminated by residual low molecular weight emulsifiers as is the case for conventional latices.

3. Stabilization by protonated tertiary amine groups at the latex particle surface.

4. Having polar and/or hydrophilic moieties in the proximity of the amine groups.

5. A particle structure such that the tertiary amine groups are concentrated at the particle surface and are covalently bonded to it.

6. The distribution of the surface active tertiary amine groups between the particle surface and its internal phase is such that the majority of the amine groups are present at the particle surface. However, at higher pH's such as those maintained near the cathode the amine groups redistribute in favor of the internal phase.

7. Electrodeposition onto electroconductive substrates including metals when the substrate is the cathode in an electrodeposition bath.

The polymers typically have a weight average molecular weight of about 50,000 to 500,000, are stable at an electro-deposition bath pH of, e.g. 6–10, and form a flexible corrosion resistant coating which results simply by removal of the coated article from the bath, followed by drying.

The wastefulness of corrosion is currently recognized as a national problem. Polymeric corrosion resistant coatings for durable metal products are now generally accepted, and many types of coatings and application systems are being used. Electrodeposited coatings are believed to be advantageous over other means of coating application, such as spray or dipping, because of more complete metal coverage, controllable uniform film thickness, automated low-cost application, efficient use of coating materials, and reduced air pollution and fire hazards. Coatings that are suitable for electrodeposition require an electrolytically conductive medium such as that provided by aqueous systems.

Aqueous, electrodepositable, corrosion resistant coatings have had their greatest acceptance as prime coats for automobiles and trucks, almost completely displacing solvent based systems. Initially, the polymeric materials constituting the paint binder were anionic polyelectrolytes of moderate molecular weight and the part to be coated was made the anode in an electrochemical cell (anodic deposition). More recently cathodic deposition of cationic polyelectrolytes of modest molecular weight (e.g., weight average molecular weight of about 2,000) is replacing anodic deposition because of improved corrosion resistance and overall performance of the coating. These coatings must undergo a baking or curing cycle to achieve chemical crosslinking of the binder in order to increase their molecular weight and related physical properties. Electrodepositable, high molecular weight, cationic latices should be polymeric binders of choice for corrosion resistant paints since they have all the good points of current lower molecular weight cationic polyelectrolyte systems, and additionally possess better physical properties with lower curing requirements (temperature and time), since the latex polymers are much higher molecular weight and can be designed with various copolymer compositions.

There are a few examples for electrodepositable cationic latices in the literature. However, all examples known to us suffer from lack of stability at neutral pH, and generally require a corrosive pH (i.e., 2–5) to maintain their stability in the deposition bath, or on electrodeposition give off noxious mercaptan byproducts. For this reason, we know of no commercial coating operations that are based on electrodeposition of cationic latices. The key impediment has been the lack of proper surface active entities that stabilize the polymer latex at neutral pH in the electrodeposition bath, but cause transport of the polymer to the cathode surface and are rapidly destroyed at the cathode so deposition of polymer can occur.

The present invention relates to the use of emulsifier-free cationic latices that are stable up to pH 10 (some even higher, see Table 8), but readily deposit on the cathode by application of DC current. Paints using these latices as binders and formulated with all other ingredients known to those skilled in the art can be prepared. When these paints are deposited on a metal surface, the deposited coating protects the coated area against corrosion while the base metal areas corrode under the same conditions.

In a preferred embodiment this invention is based on chemically incorporating tertiary amino groups into the surfaces of styrene-vinyl-acrylic latex particles. The resulting latices are stable up to pH of 10, but readily deposit on the cathode by application of DC current while the bath pH is maintained at 6.5 to 7.1. In other equally good preferred embodiments the amino group is incorporated into vinyl-acrylic or styrene-butadiene latex particles.

The advantages offered by use of the invention may be summarized as follows:

1. Use of latex results in a high weight:charge ratio, which in turn results in a lower Faraday requirement, as compared to the water soluble or dispersible cationic macro-ions (low molecular weight polymers, or cationic oligomers) of the prior art.

2. The use of high molecular weight polymer means that the coating need not be baked to cure it, i.e., cross-linked. Drying at room temperature results in adequate properties.

3. This invention results in a flexible, yet adherent coating that permits further bending and shaping of the coated metal without chipping or loss of adhesion. This is not true of low molecular weight coatings of the art, which require 3-dimensional curing that results in a somewhat brittle coating that tends to chip during further working of the coated metal.

4. The ability of the latex to exist in the bath at substantially neutral pH (i.e., to be stable under such bath conditions) in turn results in improved pigment stability. Electrocoatable paints contain pigments for purposes of ornamentation, permeability control, corrosion inhibition, and u.v. stability. These pigments are conventionally oxides or salts, and tend to dissolve at acid pH, such as is conventional in the art. Not only does this result in loss of pigment available for the coating, the metal ions of the dissolved pigment have a tendency to coagulate the latex and thereby to destroy the bath. Our ability to use neutral or higher pH avoids this problem.

5. When our coated work piece is removed from the bath there is much less dragout and thus less excess coating to rinse off.

6. After the removal of the work piece from the bath, the piece is rinsed, and residual material is recovered by filtration. Ultrafiltration was required for recovery of prior macro-ionic materials, whereas in the instant system, filtration using larger filter pore size and smaller pressure drops is suitable due to the large size of latex particles as compared with water soluble macro-ions.

7. Emulsion polymerization techniques allow preparation of numerous copolymers to tailor design properties of coating.

As to chemical identity, the invention requires a latex in which the individual particle is a micelle of polymeric molecules made up of carbon-to-carbon chains, said polymer molecules comprising moieties of monomers A and X in which A is the residue of an ethylenically unsaturated monomer and X is the residue of an ethylenically unsaturated monomer containing protonated tertiary and/or quaternary nitrogen within 10 atoms of a hydrophilic moiey, unit, or group, such as ester, amide, carbonyl, hydroxy, amine, and the like.

The process of making such latices will next be described.

The Basic Latex-Forming Process

The exact latices as herein described and claimed cannot be prepared by the routine emulsion polymerization procedures well known in the art. On the contrary, special conditions are required, as will now be explained.

Our preferred equipment suitably includes a polymerization reactor, a first reservoir, and a second reservoir. The vessel arrangement is such that the contents of the respective reservoirs can be pumped into the reactor at controlled rates.

The use of this apparatus in the invention process is detailed in Example 50, q.v.

To start, all of the water, all of the amino-containing monomer ("X", as elsewhere herein defined), 10–12% of the "A" monomer (as elsewhere herein-defined), and about 25% of the acid are added at room temperature to the polymerization reactor. The mix is homogenized without the use of any emulsifier, and with extremely fast agitation (e.g. 50–300 rpm) for about ten minutes. Then the rate of agitation is slowed to moderate agitation (e.g. 2–5 rpm). Then the reactor is heated to 68°–70° C., with continued moderate stirring, at which point the initiator is added, with 50% of the acid. The latex particles typical of our new product begin to form immediately, i.e., a "skin" begins to form on each particle, and this skin contains at least 50% of the amine groups located in or on the particle. The reaction temperature at this phase (and indeed throughout the whole polymerization) is preferably maintained at 70°–85° C., and the optimum is preferably 70°–80° C.

The first reservoir contains about 45% of monomer "A", plus initiator. The second reservoir contains the balance of monomer "A", plus initiator. (Actually, "A" may be a mix of two or more different monomers.)

Continuing, 15 minutes after the addition of initiator into the polymerization reactor, we begin pumping the contents of the first reservoir into the polymerization reactor, at a rate of about 11–12 ml/min. (i.e., about 2% of its contents per minute). Simultaneously the contents of the second reservoir are pumped into the first reservoir at about the same rate. Total monomer addition time from these two reservoirs should not exceed about 90 minutes. After about half of the monomers have been added, the remaining 25% of the acid is added. We aim at about 15–50% solids.

Using this procedure, we can now describe the formation and growth of an individual particle. At first, as we have shown, the particle is relatively small, but nevertheless has a skin in which the protonated amine groups are concentrated. As more monomer is added, the incoming monomer tends to enter the existing particles as "filler;" that is, the newly added monomer makes relatively few new latex particles, but rather is attracted to the existing particles, enters them either as monomer or as polymer, and migrate below the hydrophilic skin, where they constitute "filler."

In further detail, and restated, the inventive process involves making a latex comprising copolymerizing monomer X as hereinafter defined with monomer A as hereinafter defined in a A:X mole ratio of about 100 to 5:1, (preferably 5–10:1) by the following steps:

(a) in a polymerization zone, copolymerizing at about 70°–85° C. in water substantially all of monomer X with about 5–20% (preferably about 10%) of the total of monomer A to form a seed latex particle in which at least 50% of the amine groups are at the surface;

(b) adding the balance of monomer A to the polymerization zone, whereby said monomer A enters the latex particle as filler core polymer;

(c) continuing the polymerization for about 90 minutes;

(d) thereby to provide a latex with about 15–50% solids;

(e) and thereby to provide a latex in which the individual particle is characterized as follows:

(1) it consists essentially of polymeric molecules made up of carbon-to-carbon chains; said polymer molecules consisting essentially of moieties of monomers A and X in which A is the residue of at least one ethylenically unsaturated monomer and X is the residue of an ethylenically unsaturated monomer containing protonated tertiary and/or quaternary nitrogen within ten atoms (preferably 2–3 atoms) of a hydrophilic moiety; X being I, II, or III, or a mixture, viz.:

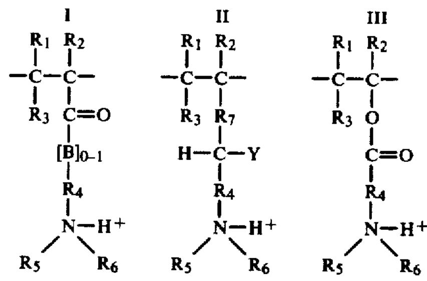

in which B is O or NH; $R_1$, $R_2$, $R_3$, $R_5$, and $R_6$ are H, $C_nH_{2n+1}$ in which n is 1–5, or phenyl, and may be the same or different; $R_4$ is —$(C_aH_{2a})$—, in which a is 1–10, and preferably 2–3;

$R_7$ is $R_4$ or $-\overset{\displaystyle O}{\overset{\|}{C}}-[B]_{0-1}-R_4-$;

-continued

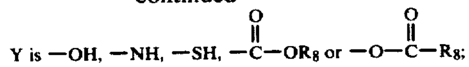

$R_8$ is H or $C_nH_{2n+1}$ in which n is 1-10;

A being the residue of an ethylenically unsaturated monomer, IV or V, or a mixture, viz.:

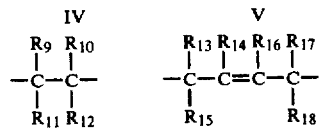

in which the R's, $R_9$-$R_{18}$ inclusive, are the same or different, and are H, $C_nH_{2n+1}$, in which n is 1-10, carboxylate (either of the C—C bond type such as in acrylates or C—O bond type such as in vinyl acetate), phenyl, hydroxy, chloride, amine, cyano, vinyl, or thiol;

(2) the particle diameter is in the range of about 0.1-5 microns;

(3) the weight average molecular weight of polymers in the particle is 10,000 to 1,000,000; preferably 50,000 to 500,000;

(4) the total number of amine groups per particle is about $0.8\times10^8$ to $1.2\times10^{14}$ (5) of the aforesaid total number, at least about 50% (preferably 70-90%) are at the surface of the particle and the balance are below the surface;

(6) the number of said surface amine groups per square Angstrom of surface is about 0.5 to 25;

(7) a hydrophilic group is within 10 atoms of the amine group;

(8) density of the particle is 0.8-1.1 gm/cm$^3$;

(9) the particles form a latex with a pH stability typically up to a value within the range of about 6-12;

(10) the particle has an electrophoretic mobility of about 2-5 (microns/second) (volts/centimeter) at neutral pH;

(11) the quantity of electrical current needed to deposit one gram of particles on the cathode is about 10 to 80 coulombs and preferably 15-30 coulombs; and

(12) the number of polymer molecules in a particle is about $10^6$ to $1.5\times10^{14}$.

Ethylenically unsaturated monomer "A" includes the monoalkylenes, e.g., ethylene, propylene, butene, and the like, as well as the alkenyl aromatic compounds, i.e., the styrene compounds; the derivatives of $\alpha$-methylene monocarboxylic acids such as the acrylic esters, acrylic nitriles and methacrylic esters; derivatives of $\alpha,\beta$-ethylenically unsaturated dicarboxylic acids such as maleic esters; unsaturated alcohol esters; unsaturated ketones; unsaturated ethers; and other polymerizable vinylidene compounds such as vinyl chloride and vinylidene fluoride. Specific examples of such ethylenically unsaturated compounds are styrene, $\alpha$-methylstyrene, ar-methylstyrene, ar-ethylstyrene, $\alpha$-ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl propionate, vinyl chloride, vinyl bromide, vinylidene chloride, vinylidene fluoride, vinyl methyl ketone, methyl isopropenyl ketone, and vinyl ether.

Such non-ionic monomers form water-insoluble homopolymers or water-insoluble copolymers when more than one of the group is used. However, there may be used as copolymerized constituents with the above kinds of monomers other monomers which as homopolymers would be water-soluble. The hydrophilic, water-soluble monomers are represented by hydroxyethyl acrylate, hydroxyethyl methacrylate, acrylamide, methacrylamide, N-methylol acrylamide, N-methylol methacrylamide and other modified acrylamides such as diacetone acrylamide, and diacetone methacrylamide.

In addition "A" includes the conjugated dienes, butadiene, isoprene, neoprene, chloroprene, and the like.

The weight ratio of protonated tertiary or quaternary nitrogen-containing monomer "X" to the other ethylenically unsaturated monomer or monomers "A" in the forming mix is suitably 0.01-0.5 to 1. This ratio may or may not be the same as the A:X ratio in the "A/X" structure, since formation of A homopolymer and X homopolymer may result in a variation of the A:X ratio in the A—X-A copolymer.

Our latices can be employed as such to electrodeposit clear films, but ordinarily they are used as a vehicle along with a pigment composition. The pigment composition used may be any conventional type, for example, iron oxides, lead oxides, strontium chromate, carbon black, titanium dioxide, talc, barium sulfate, and clays, silicas, calcium carbonate, and other extenders, and the like, as well as combinations of these and similar pigments or extenders. Color pigments such as cadmium yellow, cadmium red, phthalocyanine blue, chromic yellow, toluidine red, hydrated iron oxide, and the like may also be included.

Dispersing or surface active agents can be used with the pigments and may be of the non-ionic or cationic type or a combination of these types. However, their usage is not necessary. The pigment and surface active agent may be ground together in a portion of the vehicle to make a paste, and this is blended with a major portion of the vehicle to produce a coating composition. There may also be included in the coating compositions additives such as anti-oxidants, wetting agents, dryers, anti-foaming agents, suspending agents, and the like.

It has been found in most instances that desirable coatings are obtained using pigmented compositions containing weight ratios of pigment to latex of about 1.5 to 1 or less and preferably less than about 1 to 1.

Apparatus and Test Procedure

The electrodeposition runs of Table 4 were made in a 400 ml glass vessel with two four-inch tall ¼ inch graphite rods as anodes, equipped with a cathode clip to hold the coupons being coated, a stirrer with motor, and a pH reader with remote register. A D.C. transformer plugged in to an A.C. 220 volt line gave voltage (variable through a rheostat) of 0 to 50 volts. An ammeter was connected in series with the transformer and the anode. In use, the vessel was filled with about 300 ml of the latex being tested. The coupons coated were Bonderite EPI cold roll steel, 2×1 inches. They were completely immersed in the latex being tested, except where they were held by the suspending clip.

During a given run, the initial voltage may increase (up to the open circuit value), and the current may drop. Both changes are caused by the increasing electrical resistance of the coating as it is deposited.

EXAMPLE 1

A typical latex was prepared by reacting together the following ingredients in accordance with "The Basic Latex-Forming Process" above described:

| | |
|---|---|
| Water | 300 ml |
| Diethyl amino ethyl methacrylate, | 2.0 ml |
| Butyl acrylate | 35.0 ml |
| Styrene | 35.0 ml |
| HCl (37.7%) | 1.0 ml |
| $H_2O_2$ (30%) | 2.0 ml |
| $Fe(NO_3)_3$ | $1 \times 10^{-4}$ g. |
| Azoisobutyronitrile | 0.25 g |

All of the water, diethyl amino ethyl methacrylate, HCl, $H_2O_2$, $Fe(NO_3)_3$, and 10 ml butyl acrylate were mixed in a blender/homogenizer for 2 to 3 minutes and charged to a 500 ml reactor. The temperature was brought to 60° C. and after 30 minutes the remainder of butyl acrylate, styrene, and AIBN were added dropwise to the reactor over the period of approximately two hours. After 24 hours a terpolymer latex was formed. The polymer was basically a butyl acrylate-styrene copolymer, but with a minor but crucial amount of diethyl amino ethyl methacrylate in the chain. The latter moiety reacted with the HCl to provide the protonated amine group which is essential to give stability at a bath pH of 6.5-6.8. The molecular weight of the polymer (weight average basis) as above prepared was about 100,000-250,000.

Following the procedure of Example 1, additional latices were made up as shown in Tables 1, 2, and 3.

TABLE 1

RECIPE AND CONDITIONS

| Example | DEAEM | BA | MMA | EA | St | Is | Bu | HCl | $H_2O_2$ | $Fe(NO_3)_3$ | AIBN | $Bz_2O_2$ | Reaction Time | Temp. |
|---|---|---|---|---|---|---|---|---|---|---|---|---|---|---|
| 2 | 0.75 ml | 7 ml | 31 ml | 63 ml | — | — | — | 1 ml | 2 ml | $1 \times 10^{-4}$ g | — | — | 20 hr. | — |
| 3 | 0.75 | 7 | 31 | 63 | — | — | — | 1 | 4 | $2 \times 10^{-4}$ | — | — | 22.5 | 73° C. |
| 4 | 0.75 | 7 | — | — | — | — | — | 1 | 2 | $1 \times 10^{-4}$ | — | — | 17 | 66 |
| 5 | 0.75 | 7 | 15 | 31 | — | — | — | 6.75 | 3 | $1 \times 10^{-4}$ | — | 0.5 g | 72 | 67 |
| 6 | 1.0 | 7 | 15 | 32 | — | — | — | 2 | 2 | $1 \times 10^{-4}$ | — | — | 24 | 67 |
| 7 | 2.0 | — | — | — | 20 ml | — | 10 ml | 1 | 2 | $1 \times 10^{-4}$ | — | — | 20 | 68 |
| 8 | 2.0 | 10 | 15 | 31 | — | — | — | 2.25 | 2 | $1 \times 10^{-4}$ | — | — | 23 | 68 |
| 9 | 2.0 | 10 | 10 | 63 | — | — | — | 1.5 | 2 | $1 \times 10^{-4}$ | — | — | 26 | 66 |
| 10 | 2.0 | — | — | — | 20 | 20 | — | 1 | 2 | $1 \times 10^{-4}$ | — | — | 18 | 68 |

DEAEM = diethyl amino ethyl methacrylate, BA = butyl acrylate, MMA = methyl methacrylate, EA = ethyl acrylate, St = styrene, Is = isoprene, Bu = butadiene, AIBN = azoisobutyronitrile, $Bz_2O_2$ = benzoyl peroxide

TABLE 2

RECIPE AND CONDITIONS

| Example | DEAEM | BA | St | Is | MMA | VA | HCl | $H_2O_2$ | $Fe(NO_3)_3$ | AIBN | Reaction Time | Reaction Temp. |
|---|---|---|---|---|---|---|---|---|---|---|---|---|
| 11 | 2 ml | 45 ml | 30 ml | — | — | — | 1.5 ml | 2 ml | $1 \times 10^{-4}$ g | — | 28 hrs. | 63° C. |
| 12 | 2 ml | — | 10 ml | 10 ml | — | — | 1.75 ml | 2 ml | $1 \times 10^{-4}$ g | — | 26 hrs. | 68° C. |
| 13 | 2 ml | — | 15 ml | 12 ml | — | — | 1 ml | 4 ml | $1 \times 10^{-4}$ g | — | — | — |
| 14 | 2 ml | 35 ml | 30 ml | — | — | — | 2 ml | 2 ml | $1 \times 10^{-4}$ g | 0.25 g | 24.5 hr. | 65° C. |
| 15 | 2 ml | — | 20 ml | 20 ml | — | — | 2 ml | 2 ml | $1 \times 10^{-4}$ g | — | 28 hrs. | 66° C. |
| 16 | 2 ml | — | 18 ml | 20 ml | — | 2 ml | 2 ml | 2 ml | $1 \times 10^{-4}$ g | — | 28 hrs. | 66° C. |
| 17 | 2 ml | 28 ml | 28 ml | — | 4 ml | — | 1.5 ml | 2 ml | $1 \times 10^{-4}$ g | 0.25 g | 27 hrs. | 69° C. |

DEAEM = diethyl amino ethyl methacrylate, BA = butyl acrylate, MMA = methyl methacrylate, St = styrene, VA = vinyl acetate, Is = isoprene, AIBN = azoisobutyronitrile

TABLE 3

RECIPE AND CONDITIONS

| Example | DEAEM | BA | St | MMA | VA | HCl | $H_2O_2$ | $Fe(NO_3)_3$ | AIBN | Reaction Time (Hrs.) | Temp. |
|---|---|---|---|---|---|---|---|---|---|---|---|
| 18 | 2.0 ml | 32 ml | 25 ml | — | 3.0 ml | 2.5 ml | 2 ml | $1 \times 10^{-4}$ g | 0.25 g | 28 | 45° C. |
| 19* | 2.5 ml | 23 ml | 28 ml | — | 2.5 ml | — | — | — | — | 25 | 60° C. |
| 20 | 4.0 ml | 28 ml | 28 ml | 4 ml | — | 2.0 ml | 2 ml | $1 \times 10^{-4}$ g | 0.25 g | 29.5 | 62° C. |
| 21 | 4.0 ml | 26 ml | 26 ml | 8 ml | — | 2.0 ml | 2 ml | $1 \times 10^{-4}$ g | 0.25 g | 29.5 | 73° C. |
| 22 | 4.0 ml | 26 ml | 26 ml | — | 8.0 ml | 2.0 ml | 2 ml | $1 \times 10^{-4}$ g | 0.25 g | 28.5 | 60° C. |
| 23 | 4.0 ml | 28 ml | 28 ml | — | 4.0 ml | 2.0 ml | 2 ml | $1 \times 10^{-4}$ g | 0.25 g | 28.3 | 74° C. |
| 24 | 4.0 ml | 28 ml | 28 ml | 4 ml | — | 2.0 ml | 4 ml | $1 \times 10^{-4}$ g | 0.25 g | 29.5 | 74° C. |

*Contained 1 ml diisopropyl benzene hydroperoxide, 2.5 ml Tween 60, 1 g sodium pyrophosphate and 2.5 ml triethylene tetramine;
DEAEM = diethyl amino ethyl methacrylate; BA = butyl acrylate; MMA = methyl methacrylate; St = styrene; VA = vinyl acetate; AIBN = azoisobutyronitrile.

Using the electrodeposition apparatus described above, runs were made with various of the above described latices. These runs are collected in Tables 4 and 5. As shown in Table 4, five runs were made with the latex of Example 1, three with the latex of Example 14, and 5 with the latex of Example 17. The bath pH was adjusted in each case by ion exchange resin. At the end of the deposition time the coated coupon was removed, drained, and allowed to dry at room temperature or for half an hour in reduced pressure at 40° C., following which it was examined. The procedure for Table 5 was similar.

TABLE 4

| | | | | ELECTRODEPOSITION | | | | |
|---|---|---|---|---|---|---|---|---|
| Sample | Bath pH | Initial Voltage | Final Voltage | Initial Current | Final Current | Deposition Time | Mode | Coating |
| Ex. 1 -1 | 6.7 | 30 V | 32 V | 20 MA | 20 MA | 7 min. | Const. Current 20 MA Max. Voltage 50 V | Latex settled out[1] |
| -2 | 6.7 | 10 V | 11 V | 15 MA | 15 MA | 25 min. | Const. Current 15 MA Max. Voltage 50 V | Poor coating[1] |
| -3 | 6.7 | 10 V | 10 V | 15 MA | 15 MA | 20 min. | Const. Current 15 MA Max. Voltage 50 V | Poor coating[1] |
| -4 | 5.03 | 4 V | 7 V | 10 MA | 10 MA | 20 min. | Const. Current 10 MA Max. Voltage 50 V | Very smooth, thick, adhering coating |
| -5 | 5.03 | 4 V | 6 V | 10 MA | 10 MA | 17 min. | Const. Current 10 MA Max. Voltage 50 V | Thick, adhering coating-contained bubbles |
| Ex. 14 -1 | 5.8 | 3 V | 50 V | 10 MA | 5 MA | 15 min. | Const. Current 10 MA Max. Voltage 50 V | Coated well, but uneven |
| -2 | 5.8 | 3 V | 30 V | 10 MA | 10 MA | 11 min. | Const. Current 10 MA Max. Voltage 50 V | Thick, adhering, uneven coating |
| -3 | 5.8 | 3 V | 3 V | 10 MA | 10 MA | 3 min. | Const. Current 10 MA Max. Voltage 50 V | Coated well |
| Ex. 17 -1 | 6.1 | 10 V | 25 V | — | — | 3 min. | Const. Current 10 MA Max. Voltage 50 V | Very thick, smooth, even coating, good adhesion |
| -2 | 6.1 | 10 V | 18 V | — | — | 1 min. | Const. Current 10 MA Max. Voltage 50 V | Thick, smooth, even coating, good adhesion |
| -3 | 6.1 | 10 V | 12 V | — | — | 30 sec. | Const. Current 10 MA Max. Voltage 50 V | Thick, smooth, even coating, good adhesion |
| -4 | 6.1 | 10 V | 14 V | — | — | 45 sec. | Const. Current 10 MA Max. Voltage 50 V | Thick, smooth, even coating, good adhesion |
| -5 | 6.1 | 10 V | 12 V | — | — | 15 sec. | Const. Current 10 MA Max. Voltage 50 V | Very even, very adhering coating |

[1]We encountered mechanical problems in preparing the latex and setting up the apparatus, soon overcome.

TABLE 5

| | | | ELECTRODEPOSITION | | | |
|---|---|---|---|---|---|---|
| Run | Bath pH | Initial Voltage | Final Voltage | Constant Current | Time | Coating Observations |
| Example 17-1 | 6.1 | 10 volts | 25 volts | 10 MA | 3 min. | Very thick, smooth coating |
| Example 17-2 | 6.1 | 10 volts | 25 volts | 10 MA | 2 min. | Thick, smooth, even coating |
| Example 17-3 | 6.1 | 10 volts | 18 volts | 10 MA | 1 min. | Thick, smooth, even coating |
| Example 17-4 | 6.1 | 10 volts | 14 volts | 10 MA | 45 sec. | Very even, adhering, thin coating |
| Example 19 | 6.11 | 4 volts | 3 volts | 10 MA | 20 min. | Didn't coat plate |
| Example 21-1 | 4.6 | 5 volts | 6 volts | 10 MA | 2 min. | Smooth, even coating. Rust appearing at the corners of the plate |
| Example 21-2 | 6.16 | 6 volts | 8 volts | 10 MA | 2 min. | Good coating |
| Example 21-3 | 6.16 | 6 volts | 6 volts | 10 MA | 30 sec. | Very good, smooth, even, transparent coating |
| Example 23-1 | 6.06 | 5.5 volts | 6 volts | 10 MA | 2 min. | Thin, smooth, hard, transparent, adhering coatings |
| Example 23-2 | 6.06 | 5 volts | 5 volts | 10 MA | 30 sec. | Very good coating |
| Example 24-1 | 6.08 | 5 volts | 5 volts | 10 MA | 2 min. | Thin, smooth, glossy coating |
| Example 24-2 | 6.08 | 5 volts | 5 volts | 10 MA | 1 min. | Thin, smooth, adhering, glossy coating |

EXAMPLE 25

A latex was prepared by reacting together the following ingredients:

| | |
|---|---|
| Butyl Acrylate (BuA) | 87 ml. |
| Dimethyl Amino Ethyl Methacrylate (DMAEM) | 3 ml. |
| 3-4 drops 37.7% HCl | |
| 2,2' Azobis (2 amidinopropane) hydrochloride (AAP) | 1 g. |
| Deionized Water | 100 ml. |

Mix $H_2O$, 7 ml. BuA, DMAEM and HCl in blender for 2 to 3 minutes and charge to a reactor. Bring temperature to 70° C. with agitation. Then add AAP while agitating and continue reaction for 1 hour.

After the 1 hour add 80 ml. BuA to the seed latex (over a period of 15-30 minutes) using drop funnel. Continue the reaction for 24 hours.

EXAMPLE 26

| | |
|---|---|
| Deionized Water | 300 ml. |
| HCl | 4.5 ml |
| Diethyl amino ethyl methacrylate (DEAEM) | 4 ml |
| Butyl Acrylate (BuA) | 26 ml |
| 2,2' azobis (2 amidinopropane) hydrochloride (AAP) | 3 g |
| Styrene (St) | 26 ml |
| Azoisobutyronitrile (AIBN) | 0.1 g |

Homogenize in blender $H_2O$, 1 ml. of HCl, DEAEM, and 6 ml. BuA for 2 to 3 minutes and charge to room temperature reactor. Add 2.5 ml. HCl and raise temperature to 70° C. Add AAP.

After 50 min. start adding remainder of monomers from drop funnels.

In first drop funnel have St. and AIBN. (Reservoir 1.)

In second drop funnel have 20 ml. BuA. (Reservoir 2.)

Have second funnel adding into first at a slower rate than first into reactor. (Should take about 90 min. to complete addition).

Ten minutes after monomer addition is complete add 1 ml. HCl and let reaction go for 24 hours.

Following the procedure of Examples 25 and 26, additional latexes were made up as shown in Table 6. If the amount of the amine-containing monomer is increased, initial addition of BuA is increased proportionately.

-continued

| | |
|---|---|
| Styrene (St) | 21 ml. |
| Azoisobutyronitrile (AIBN) | 0.1 g. |

Homogenize in blender for 2-3 minutes water, 1 ml. HCl, DMAEM, 6 ml. BuA (then 12 ml. BuA) and charge to room temperature reactor.

Add 2 ml. HCl and raise temperature to 70° C. and add AAP.

Ten minutes after the addition of AAP start adding monomers from drop funnels.

In first funnel have Styrene and AIBN.

In second funnel have the remainder of BuA.

Have second funnel adding to first at a slower rate than the contents of the first funnel into the reactor.

Ten minutes after addition of monomers is completed

TABLE 6

| Example No. | BuA, ml | St, ml | DMAEM, ml | DEAEM ml | AAP, g | AIBN g | HCl, ml | Reaction Temp, °C. | Reaction Time | pH At onset of latex instability |
|---|---|---|---|---|---|---|---|---|---|---|
| 27 | 240 | — | 9 | — | 3 | — | 1 | 70° | 21 hrs. 55 min. | 8.60 |
| 28 | 26 | 26 | — | 4 | 3 | 0.1 | 4.5 | 70° | 21 hrs. 34 min. | 7.80 |
| 29 | 31 | 21 | — | 4 | 3 | 0.1 | 3 | 75° | 24 hrs. | 8.63 |
| 30 | 36 | 16 | — | 4 | 3 | 0.1 | 4 | 72° | 24 hrs. | 8.00 |
| 31 | 31 | 21 | — | 8 | 3 | 0.1 | 4 | 78° | 24 hrs. | 8.11-8.23 |
| 32 | 31 | 21 | — | 10 | 3 | 0.1 | 4.5 | 72° | 24 hrs. | 7.31 |
| 33 | 31 | 21 | 4 | — | 3 | 0.1 | 4 | 68° | 24 hrs. 15 min. | 9.50 |
| 34 | 31 | 21 | 8 | — | 3 | 0.1 | 4 | 70° | 23 hrs. 40 min. | 8.56 |

BuA = Butyl acrylate; St = Styrene; DMAEM = Dimethylamino ethyl methacrylate; DEAEM = Diethylaminoethyl methacrylate; AAP = 2,2' Azobis (2 amidinopropane) hydrochloride; AIBN = Azoisobutyronitrile.

EXAMPLE 35

A latex was prepared by reacting together the following ingredients:

| | |
|---|---|
| Deionized water | 300 ml. |
| HCl (37.7%) | 4 ml. |
| Dimethyl amino ethyl methacrylate (DMAEM) | 4 ml. |
| Butyl acrylate (BuA) | 31 ml. |
| 2,2' Azobis (2-amidinopropane) hydrochloride (AAP) | 3 g. |

add the remaining HCl and let reaction go for 24 hours.

Following the procedure of Example 35, additional latexes were made up as shown in Table 7.

TABLE 7

| Example No. | BuA, ml | St, ml | DMAEM, ml | AAP, g | AIBN g | HCl, ml | Reaction Temp, °C. | Reaction Time | pH at onset of latex instability |
|---|---|---|---|---|---|---|---|---|---|
| 35 | 31 | 21 | 4 | 3 | 0.1 | 4 | 68° | 24 hrs. 15 min. | 9.50 |
| 36 | 31 | 21 | 8 | 3 | 0.1 | 4 | 70° | 23 hrs. 40 min. | 8.56 |
| 37 | 31 | 21 | 4 | 3 | 0.1 | [1] | 70° | 22 hrs. 30 min. | N.A. |
| 38 | 31 | 21 | 8 | 3 | 0.1 | [1] | 80° | 22 hrs. 50 min. | N.A. |
| 39 | 31 | 21 | 4 | 3 | 0.1 | 4 | 70° | 23 hrs. 50 min. | N.A. |
| 40 | 31 | 21 | 4 | 3 | 0.1 | [2] | 70° | 23 hrs. 40 min. | N.A. |
| 41 | 29 | 23 | 4 | 4 | 0.1 | 4 | 80° | 23 hrs. | N.A. |
| 42 | 29 | 23 | 4 | 4 | 0.1 | 4 | 76° | 23 hrs. 45 min. | N.A. |

BuA = Butyl acrylate; St = Styrene; DMAEM = Dimethylamino ethyl methacrylate; AAP = 2,2' Azobis (2 amidinopropane) hydrochloride; AIBN = Azoisobutyronitrile

[1]No HCl; $CO_2$ bubbled into reactor.

[2]No HCl; $CO_2$ bubbled into reactor, and 6 ml acetic acid added.

EXAMPLE 43

A latex was prepared by reacting together the following ingredients:

| | |
|---|---|
| Deionized $H_2O$ | 300 ml. |
| HCl (37.7%) | 4 ml. |
| Dimethyl Aminopropylmethacrylamide | 3 ml |

-continued

| | |
|---|---|
| (DMAPMA) | |
| Methacrylamido propyltrimethyl ammonium chloride, (MAPTAC) | 1 ml |
| 2,2' Azobis (2 amidinopropane) hydrochloride (AAP) | 3 g. |
| Butylacrylate (BuA) | 31 ml. |
| Styrene (St.) | 21 ml. |
| Azoisobutyronitrile (AIBN) | 0.1 g. |

Homogenize in blender $H_2O$, 1 ml. HCl, DMAPMA, MAPTAC, 6 ml. BuA for 2-3 min. and charge to room temperature reactor.

Add 2 ml. HCl, raise temperature to 70° C. and add AAP.

After 10 minutes start adding remainder of BuA and St. from drop funnels.

In first drop funnel have 21 ml. St. and 0.1 g. AIBN.

In second funnel have remainder of BuA.

Have second funnel adding to first at a slower rate than the first into reactor.

Ten minutes after the addition of monomers is complete add 1.0 ml. HCl and let reaction go for 24 hours.

Similar examples are shown on Table 8.

TABLE 8

| Example No. | BuA ml | St ml | DMAPMA ml | MAPTAC ml | AAP g. | AIBN g. | HCl ml | Reaction Temp. °C. | Reaction Time | pH at onset of latex instability |
|---|---|---|---|---|---|---|---|---|---|---|
| 44 | 31 | 21 | 3 | 1 | 3 | 0.1 | 4 | 70 | 24 hrs. | stable to 11.00 |
| 45 | 31 | 21 | 4 | — | 3 | 0.1 | 4 | 69 | 24 hrs. | stable to 11.00 |
| 46 | 31 | 21 | 3.6 | 0.4 | 3 | 0.1 | 4 | 70 | 24 hrs. 45 min. | stable to 12.03 |
| 47 | 31 | 21 | 7.2 | 0.8 | 3 | 0.1 | 4 | 72 | 24 hrs. 15 min. | stable to 12.16 |
| 48 | 31 | 21 | 8 | — | 3 | 0.1 | 4 | 70 | 24 hrs. 30 min. | stable to 12.15 |

BuA = Butyl acrylate; St = Styrene; DMAPMA = Dimethylamino propyl methacrylamide; MAPTAC = Methacrylamidopropyl trimethyl ammonium chloride; AAP = 2,2' Azobis (2 amidinopropane) hydrochloride; AIBN = Azoisobutyronitrile.

EXAMPLE 49

A latex was prepared by reacting together the following ingredients:

| | |
|---|---|
| Deionized $H_2O$ | 100 ml. |
| Vinyl benzyl chloride (VBC) (chloromethyl styrene) | 5 ml. |
| 2,2' Azobis (2 amidinopropane) hydrochloride (AAP) | 1.5 g. |
| HCl | 1 drop |
| Diethylamine (DEA) | 10 ml |
| Butyl acrylate (BuA) | 45 ml |

Homogenize in blender $H_2O$, VBC and HCl for 2 to 3 minutes and charge to reactor. Bring temperature to 80° C. while agitating. Charge 1.0 g. AAP and continue reaction for 3 hours.

After 3 hours add 10 ml. DEA and continue for 30 minutes while reducing temperature to 70° C.

After 30 minutes add 45 ml. BuA over a period of 15-30 minutes through a drop funnel.

After the addition of monomer is complete add 0.5 g. AAP; continue reaction for 24 hours. Conversion was 31.97%.

EXAMPLE 50

7.0 liters distilled deionized water 100 ml Dimethyl aminoethyl methacrylate 150 ml Butyl acrylate 25 ml of 37% HCl (a) Add these to a pilot-scale jacketed reactor equipped with a pump feed, and homogenize (extremely fast agitation) for 10 minutes.

(b) Slow the rate of agitation to a moderate mixing speed.

(c) Heat the reactor with 90° C. water in the jacket.

(d) When the reactor temperature reaches 68°-70° C., add 75 g of Azobis amidinopropane (AAP) initiator and 50 ml. of 37% HCL as a solution in 500 ml of distilled deionized water through the condenser.

(e) Monitor the reaction temperature so as to not exceed 85° C. (185° F.) and not to fall below 70° C. (155° F.). Optimum reaction temperature is 80° C.

(f) 15 minutes past the addition of the initiator solution start the addition of monomers through the pump, via 2 reservoirs.

| | |
|---|---|
| Reservoir 1 contains | 225 ml Butyl Acrylate, 350 ml Styrene, 6 g. Benzoyl Peroxide |
| Reservoir 2 contains | 350 ml Butyl Acrylate, 225 ml Styrene, 6 g. Azoisobutyronitrile |

The pump for Reservoir 2 should run at between 11 to 12 ml/minute (preferably 12 ml/minute) and the pump for reservoir 1 at 6-7 ml/minute (preferably 7 ml/min.). Total monomer addition time should not exceed 90 minutes and the temperature should stay within 70° C. to 80° C.

(g) During this stage (monomer addition) samples of the latex (about 5 ml) should be taken every 10 minutes and % solids is determined by gravimetric techniques. One should have the following correlation between the time when sample was taken (determined from the beginning of the monomer addition) and the % solids in the sample assuming pump 2 running at 12 ml/min and Temp.=80° C.

$$0.038 + 0.0014\,t < \frac{S}{1 - S} < 0.043 + 0.0016\,t$$

where S is percent solids and t is time elapsed from the beginning of monomer addition to the taking of the sample.

(h) Add 25 ml of 37% HCl after the monomer addition is half way through the reaction.

(i) After 24 hours a sample (about 10 ml) should be taken and percent solids is determined. If less than 15 percent solids 5 g benzoyl peroxide and 5 g benzopinacole is added to the reactor and the temperature should be increased to 95°-100° C. and reacted for 5 hours; and another sample (about 10 ml) is taken for percent solids determination.

The aim is 15.5% solids.

In the above run, conversion was 82.61:%. In an almost identical run the latex was stable to pH=10.5.

Electrodeposition runs for the latex of Example 50 (see Table 10) were made in an 8-liter glass vessel with circular 18" by 18" stainless steel anodes, about 6 inches diameter by 18 inches high, equipped with a cathode clip to hold the coupons being coated, a stirrer with motor, and a pH reader with remote register. A D.C. transformer plugged into any A.C. 220 volt line gave voltage (variable through a rheostat) of 0 to 600 volts. An ammeter was connected in series with the transformer and the anode. In use, the vessel was filled with about 7000 ml of the latex being tested. The coupons tested were Bonderite EPI cold roll steel, 4×18 inches. They were completely immersed in the latex being tested, except where they were held by the suspending clip.

During a given run, the initial voltage may increase (up to the open circuit value), and the current may drop. Both changes are caused by the increasing electrical resistance of the coating as it is deposited.

EXAMPLE 51

3300 ml $H_2O$
11 ml HCl
11 ml Fe $(NO_3)_3$ solution
22 ml Diethyl aminoethyl methacrylate
110 ml Butyl acrylate
22 ml $H_2O_2$ Mix ingredients in blender 2 to 3 minutes and charge to 70° C. reactor.

After 1 hour 20 minutes add 5.5 ml HCl.

After an additional 40 minutes start adding monomers from drop funnel.

308 ml Styrene
198 ml Butyl acrylate
44 ml Methyl methacrylate
2.75 g. Azoisobutyronitrile

EXAMPLE 52

This was identical to Example 36, except that 1% by total weight of latex of lead chromate (2.8 G.) was mixed into the formulation.

The following Table 9 gives some electrodeposition runs for several of the above described latices.

The electrodeposition runs in Table 9 were made in a 500 ml. glass vessel with two ¼" graphite electrodes as anode, about 12" high. The vessel was 2" diameter×12" high. The vessel was equipped with a cathode clip to hold the coupons being coated, and a stirrer with motor. A D.C. transformer plugged into an A.C. 220 volt line gave voltage (variable through a rheostat) of 0 to 600 volts. An ammeter was connected in a series with a transformer and the anode. In use, the vessel was filled with about 500 ml. of the latex being tested. The coupons tested were Bonderite EPI cold roll steel, 1"×12", completely immersed except where they were held by the suspending clip.

TABLE 9

| | | | | | | Electrodeposition Conditions | | | |
|---|---|---|---|---|---|---|---|---|---|
| Polymer of Example No. | pH | Initial voltage | Final voltage | Initial current | Final current | Deposition time | Bath conductivity μmhos/cm | Mode | Coating |
| Ex. 23 | 6.76 | 2 | 2 | 20 | 20 | 30 sec. | — | voltage set at 50 V current set at 20mA | good, even, smooth |
| Ex. 51 | 6.99 | 2 | 2 | 20 | 20 | 2 min. | — | voltage set at 50 V current set at 20mA | 1.76 mg/in$^2$ coating |
| Ex. 21 | 5.79 | about 2 | 2 | 10 | 10 | 2 min. | 489 | voltage set at 50 V current set at 10mA | N.A. |
| Ex. 28 | 5.70 | 2 | 3 | 10 | 10 | 2 min. | 398 | voltage set at 50 V current set at 10mA | very, very, thin coating - white |
| Ex. 29 | 7.44 | 2 | 4 | 10 | 10 | 5 min. | 122 | voltage set at 50 V current set at 10mA | good, fairly thick coating |
| Ex. 30 | 6.52 | 3 | 4 | 20 | 20 | 5 min. | 90 | voltage set at 50 V current set at 20mA | good - thick coating |
| Ex. 31 | 6.77 | 3 | 4 | 20 | 20 | 2 min. | 64 | voltage set at 50 V current set at 20mA | good - thick coating |
| Ex. 46 | 6.70 | 3 | 4 | 20 | 20 | 1.5 min. | 74 | voltage set at 50 V current set at 20mA | very thin |
| Ex. 45 | 6.55 | 3 | 4 | 20 | 20 | 1.5 min. | 93 | voltage set at 50 V current set at 20mA | thin, even coating |
| Ex. 29 | — | about 5 | about 5 | 250 | 250 | 2 min. | — | [1] | thin good coating |

[1] All settings start at zero and are increased slowly to eliminate current surge at onset.

In addition to the runs in Table 9, we note two further electrodepositions, with the latices of Examples 50 and 52, viz:

TABLE 10

| | Latex of Ex. 50 | Latex of Ex. 52 |
|---|---|---|
| Deposition pH | 6.58 | 7.38 |
| Deposition bath conductivity, μmhos/cm | 1750 | 730 |
| Current density, mA/cm | 2.08 | 3.6 |
| Voltage | 10 | 50 |
| Deposition time, seconds | 30 | 120 |
| Film thickness, mm | 0.013 –0.03 | 0.028 –0.075 |
| Weight of coating, g./cm$^2$ | 0.002 | 0.025 –0.08 |

Preferred electrocoating conditions include the electrodeposition bath conductivity being 100-4000 micromhos (more preferably, 200-2000 micromhos); current density is 1-5 milliampere/cm$^2$ of the part being coated; deposition field strength is 2-10 volts/cm between electrodes; deposition time is 15 seconds to 20 minutes; and film thickness is about 0.005-0.75 mm.

We prefer an electrodeposition bath pH of about 6-8. (See e.g., Tables 4, 5, and 10.) This implies latex stability in this pH range. Actually, our latices are typically stable up to pH 10, and in some instances, above pH 12 (cf. Table 8). On the other hand, some of them become unstable at pH as low as 7.31 (cf. Table 6). Obviously, a latex should not be used at a pH so high as to induce instability. As noted, use of pH 6-10, or more preferably pH 6-8 will generally avoid instability problems.

We claim:

1. Process of making a latex comprising copolymerizing monomer X as hereinafter defined with monomer A as hereinafter defined in a A:X mole ratio of about 100 to 5:1, by the following steps:

(a) in a polymerization zone, copolymerizing at about 70°-85° C. in water substantially all of monomer X with about 5-20% of the total of monomer A to form a seed latex particle in which at least 50% of the amine groups are at the surface;

(b) adding the balance of monomer A to the polymerization zone, whereby said monomer A enters the latex particle as filler core polymer;

(c) continuing the polymerization for at least 90 minutes;

(d) thereby to provide a latex with about 15-50% solids;

(e) and thereby to provide a latex in which the individual particle is characterized as follows:

(1) it consists essentially of polymeric molecules made up of carbon-to-carbon chains; said polymer molecules consisting essentially of moieties of monomers A and X in which A is the residue of at least one ethylenically unsaturated monomer and X is the residue of an ethylenically unsaturated monomer containing protonated tertiary and/or quaternary nitrogen within ten atoms of a hydrophilic moiety; X being I, II, or III, or a mixture, viz.:

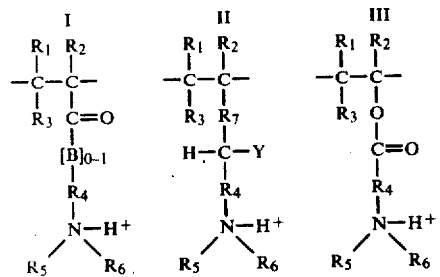

in which B is O or NH; $R_1$, $R_2$, $R_3$, $R_5$, and $R_6$ are H, $C_nH_{2n+1}$ in which n is 1-5, or phenyl, and may be the same or different; $R_4$ is $—(C_aH_{2a})—$, in which a is 1-10;

$R_7$ is $R_4$ or $-\overset{\overset{\displaystyle O}{\|}}{C}-[B]_{0-1}-R_4-$;

Y is $-OH$, $-NH$, $-SH$, $-\overset{O}{\overset{\|}{C}}-OR_8$ or $-O-\overset{O}{\overset{\|}{C}}-R_8$;

$R_8$ is H or $C_nH_{2n+1}$ in which n is 1-10; a being the residue of an ethylenically unsaturated monomer, IV or V, or a mixture, viz.:

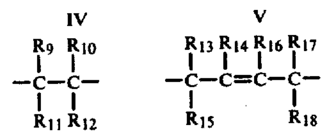

in which the R's, $R_9$-$R_{18}$ inclusive, are the same or different, and are H, $C_nH_{2n+1}$, in which n is 1-10, carboxylate ester, phenyl, hydroxy, chloride, amine, cyano, vinyl, or thiol;

(2) the weight average molecular weight of polymers in the particle is 10,000 to 1,000,000;

(3) the total number of amine groups per particle is about $0.8\times10^8$ to $1.2\times10^{14}$ (4) of the aforesaid total number, at least about 50% are at the surface of the particle and the balance are below the surface;

(5) the number of said surface amine groups per square Angstrom of surface is about 0.5 to 25;

(6) a hydrophilic group is within 10 atoms of the amine group;

(7) the particles form a latex with a pH stability within the range 6-12; and (8) the quantity of electrical current needed to deposit one gram of particles on the cathode is about 10 to 80 coulombs.

2. Process according to claim 1 in which the A:X mole ratio is about 50-10:1; in (a) about 10% of A is reacted; in (1) the quaternary nitrogen is within 2-3 carbon atoms of the hydrophilic moiety and a is 2-3; in (4) 70-90% of the amine groups are at the surface; in (7) the pH stability is within the range 6-10; in (8) the current is 15-30 coulombs.

3. Process according to claim 2 in which in (1) the quaternary nitrogen is within 2 carbon atoms of the hydrophilic moiety.

4. Method according to claim 1 in which the latex is made by copolymerizing diethyl amino ethyl methacrylate, butyl acrylate, and styrene.

5. Method according to claim 1 in which the latex is made by copolymerizing diethyl amino ethyl methacrylate, butyl acrylate, methyl methacrylate, and ethyl acrylate.

6. Method according to claim 1 in which the latex is made by co-polymerizing diethyl amino ethyl methacrylate and butyl acrylate.

7. Method according to claim 1 in which the latex is made by copolymerizing diethyl amino ethyl methacrylate, styrene, and butadiene.

8. Method according to claim 1 in which the latex is made by copolymerizing diethyl amino ethyl methacrylate, styrene, and isoprene.

9. Method according to claim 1 in which the latex is made by copolymerizing diethyl amino ethyl methacrylate, styrene, isoprene, and vinyl acetate.

10. Method according to claim 1 in which the latex is made by copolymerizing diethyl amino ethyl methacrylate, butyl acrylate, styrene, and methyl methacrylate.

11. Method according to claim 1 in which the latex is made by copolymerizing diethyl amino ethyl methacrylate, butyl acrylate, styrene, and vinyl acetate.

12. Method according to claim 1 in which the latex is made by copolymerizing dimethyl amino ethyl methacrylate and butyl acrylate.

13. Method according to claim 1 in which the latex is made by copolymerizing dimethyl amino ethyl methacrylate, butyl acrylate, and styrene.

14. Method according to claim 1 in which the latex is made by copolymerizing dimethyl amino propyl methacrylamide, methacrylamido propyl trimethyl ammonium chloride, butyl acrylate, and styrene.

15. Method according to claim 1 in which the latex includes a pigment.

* * * * *